(No Model.) 9 Sheets—Sheet 1.

G. W. BAKER.
LUBRICATOR.

No. 246,653. Patented Sept. 6, 1881.

(No Model.)

G. W. BAKER.
LUBRICATOR.

No. 246,653. Patented Sept. 6, 1881.

Witnesses—
F. B. Townsend
L. M. Freeman.

Inventor—
Geo. W. Baker
By S. B. Coupland & Co.,
Attys.

(No Model.) 9 Sheets—Sheet 5.

G. W. BAKER.
LUBRICATOR.

No. 246,653. Patented Sept. 6, 1881.

WITNESSES.
F. B. Townsend
L. M. Freeman.

INVENTOR-
Geo. W. Baker
By L. B. Coupland & Co.,
attys.

(No Model.) 9 Sheets—Sheet 7.

G. W. BAKER.
LUBRICATOR.

No. 246,653. Patented Sept. 6, 1881.

Witnesses
F. B. Townsend
L. M. Freeman

Inventor
Geo. W. Baker
By L. B. Coupland & Co.
Attys.

(No Model.)

G. W. BAKER.
LUBRICATOR.

No. 246,653. Patented Sept. 6, 1881.

Witnesses
F. B. Townsend
L. M. Freeman

Inventor
Geo. W. Baker
By L. B. Coupland & Co.
Attys.

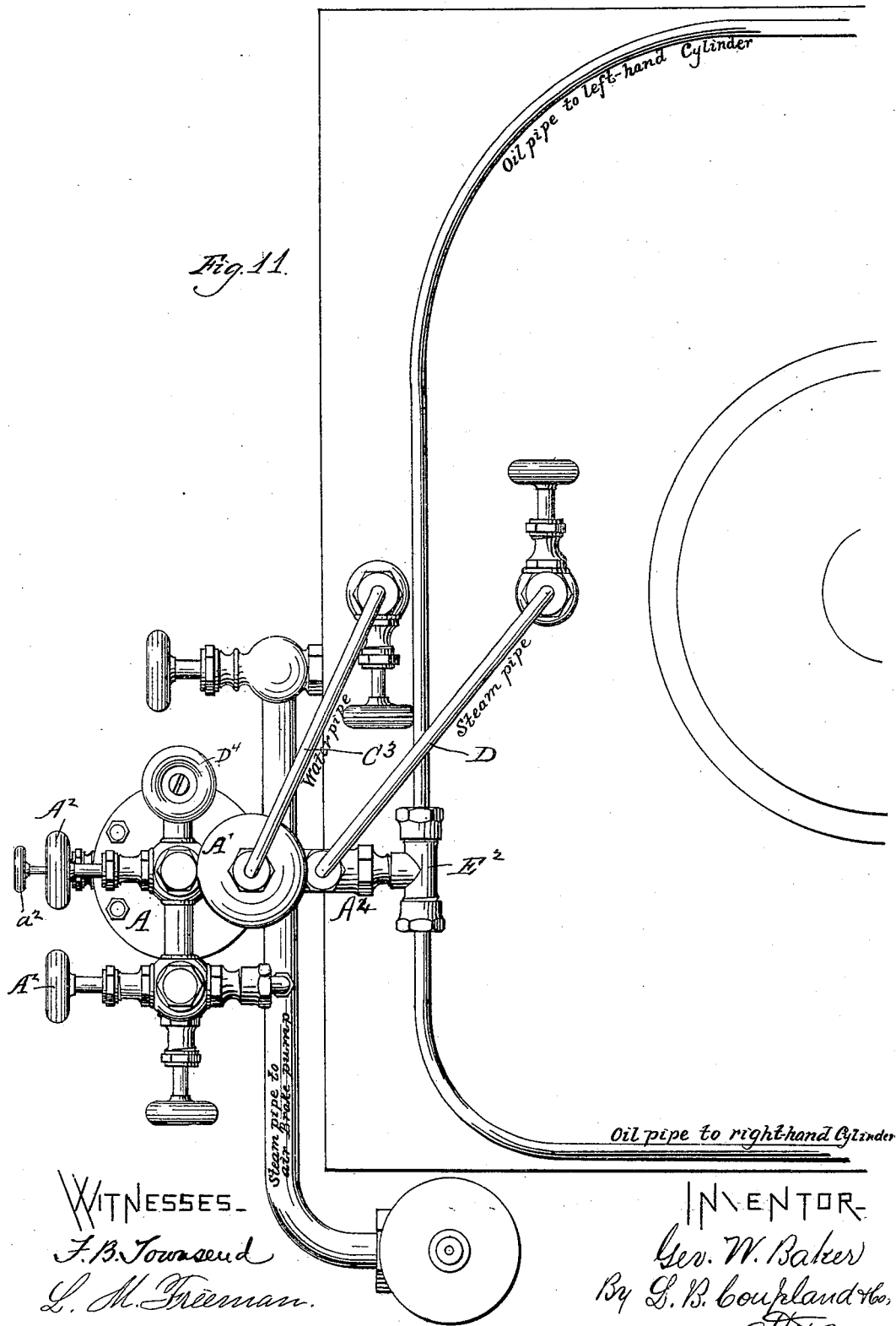

UNITED STATES PATENT OFFICE.

GEORGE W. BAKER, OF CHICAGO, ILLINOIS.

LUBRICATOR.

SPECIFICATION forming part of Letters Patent No. 246,653, dated September 6, 1881.

Application filed February 24, 1881. (No model.)

*To all whom it may concern:*

Be it known that I, GEORGE W. BAKER, of Chicago, in the county of Cook and State of Illinois, have invented certain new and useful Improvements in an Automatic Lubricating Apparatus; and I do hereby declare the following to be a full, clear, and exact description of the invention, that will enable others skilled in the art to which it appertains to construct and make use of the same, reference being had to the accompanying drawings, and to letters of reference marked thereon, forming a part of this specification.

This invention relates to that class of lubricators which are especially designed to lubricate the interior working parts of steam-engines, and is automatically operated by means of a hydrostatic pressure or water-column.

The exact construction, arrangement, and operation of the apparatus will be hereinafter more fully described in detail.

Figure 1:
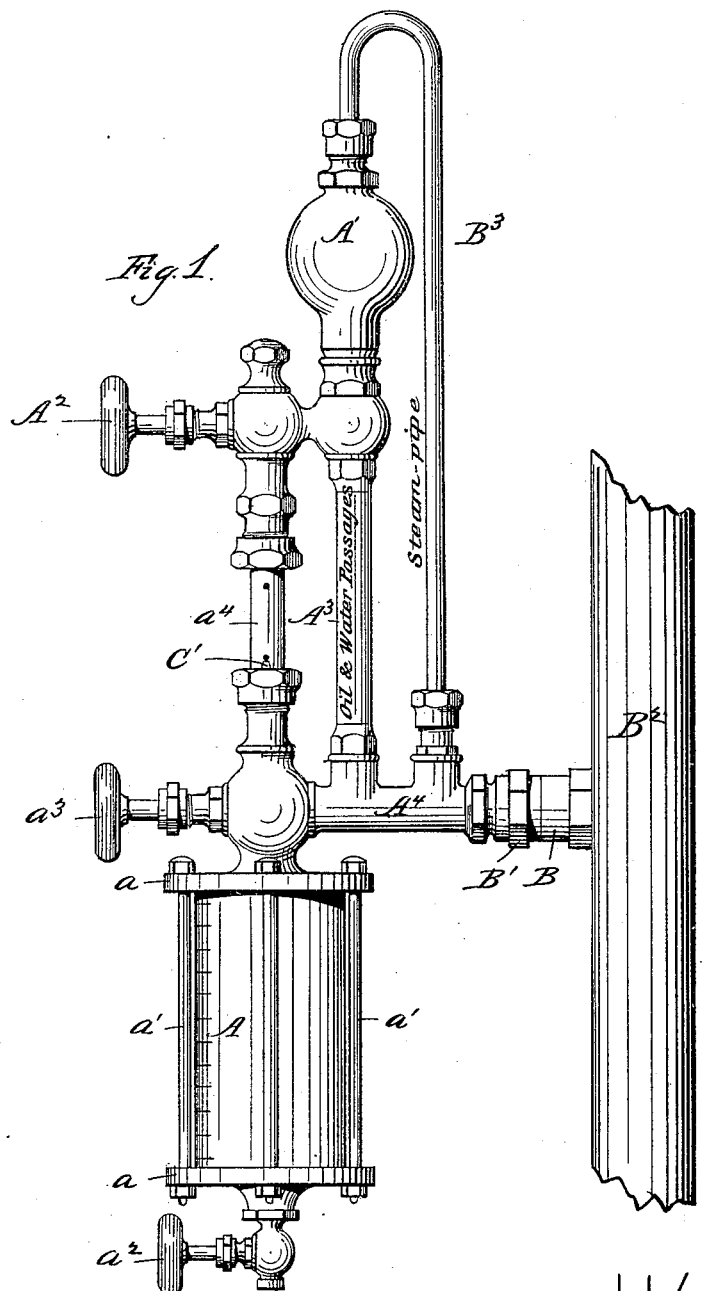

Referring to the drawings, Figure 1, Sheet 1, is a side elevation of my improved lubricating apparatus attached to the steam-pipe of a stationary engine. A represents a transparent oil-reservoir, clamped between the flanges $a$ $a$ by means of the bolts or rods $a'$ $a'$, forming substantially an air-tight receptacle; $a^2$, waste-valve for drawing the water out of the oil-reservoir; $a^3$, valve for closing the water-passage between the oil-reservoir and the condensing-chamber A'; $a^4$, transparent indicating-tube; A², valve closing oil-passage; A³, stand-pipe inclosing independent oil and water passages; A⁴, horizontal supporting-stem; B, coupling, provided with the independent rotating collar B', forming the attaching connection between the steam-pipe B² and the outer end of the horizontal stem A⁴; B³, steam-pipe leading to the condensing-chamber.

Figure 2:
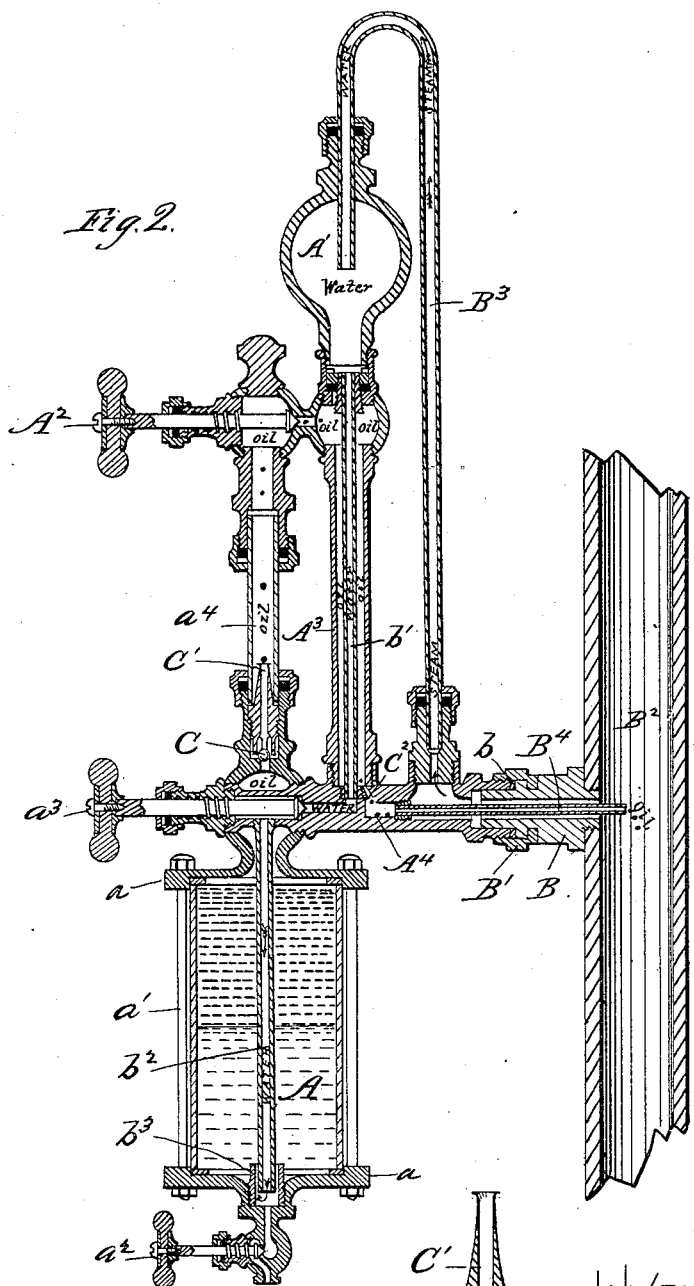

Fig. 2, Sheet 2, is a vertical central section of the apparatus illustrated in Fig. 1, showing the oil and water passages and the interior arrangement of the several parts. The horizontal stem A⁴ and the coupling part B have a single cored passage, through which the steam for condensation passes to the condensing-chamber A'. Arranged on the interior of the stem A⁴ is the oil-tube B⁴, the inner end of which has a threaded connection in the cored passage at a point beyond the steam-passage leading to the condensing-chamber, the opposite end projecting into the steam-pipe of the engine, as shown in the drawings. This oil-tube is considerably smaller than the cored passage, so as to leave an annular space between the inclosing-walls and the oil-tube B⁴ for the passage of the steam to the condenser. One end of the coupling B is tapped into the steam-pipe B², the opposite end being provided with a collar, B', which rotates independent of the coupling, and has a threaded connection with the attaching end of the stem A⁴. A gasket, $b$, is interposed between the coupling and the stem in order to insure a tight joint. This form of construction conveniently admits of the lubricator being attached without having to rotate the whole apparatus. The stand-pipe A³ incloses the oil and water passages. The water from the condensing-chamber, on its way to the oil-reservoir, passes down through the inserted tube $b'$, and the oil drops down through the annular space between the tube $b'$ and the inclosing stand-pipe. The vertical pipe $b^2$, placed on the interior of the oil-reservoir, is a continuation of the water-passage leading from the condensing-chamber and discharges the water at the bottom of the reservoir. The lower open end of the pipe $b^2$, in connection with the tube $b^3$, forms a trapping device for the purpose of retaining a small quantity of water in the lower end of the reservoir, thereby keeping the lower open end of the pipe $b^2$ constantly submerged, preventing the oil from entering the passage communicating with the condenser, and guarding against the danger of steam entering and fracturing the glass reservoir. After the lubricator is attached the valve $a^3$ controlling the water-passage between the condenser and oil-reservoir should be opened and the water allowed to enter the reservoir and pass up into and fill the glass indicating-tube $a^4$. Now close the communication with the condensing-chamber and open the waste-valve $a^2$ and discharge the water from the reservoir, the water in the glass tube being prevented from escaping by the ball-valve C, which automatically controls the oil-passage at this point. The reservoir may now be filled with oil and the globe-valves controlling the oil and water passages adjusted to regulate the operations of the apparatus in accordance with the feed or flow of oil required. As the water from the condenser is received into the reservoir the oil is forced upward and discharged from the end of the nozzle C' in the form of drops, and floats up through the body of water held in the glass indicating-tube into the horizontal passage controlled by the globe-valve A², then drops down through the stand-pipe A³, passes into the horizontal stem A⁴ through the oblique passage C², thence through the inclosed tube or pipe B⁴, and finally mingles with the steam and is carried to the surfaces to be lubricated, all as indicated in the drawings.

Figure 3:

Fig. 3 is an enlarged longitudinal section of the nozzle C'. This nozzle is made bell-mouthed at the upper end, as shown, which form of construction serves the purpose of allowing the drop of oil to form on the enlarged interior area, and prevents it from breaking away in small particles before the full-sized drop is formed. When the nozzle is not so constructed as to provide an exterior seating area for the drop of oil to form on, the action of the water contained in the indicating-tubes $a^4$, incident to the vibration of the engine, often causes the drops of oil to separate into small parts, thereby making it a difficult matter to regulate the apparatus so as to feed any required number of drops per minute. This I obviate by the employment of the peculiar-shaped nozzle shown and described.

Figure 4:
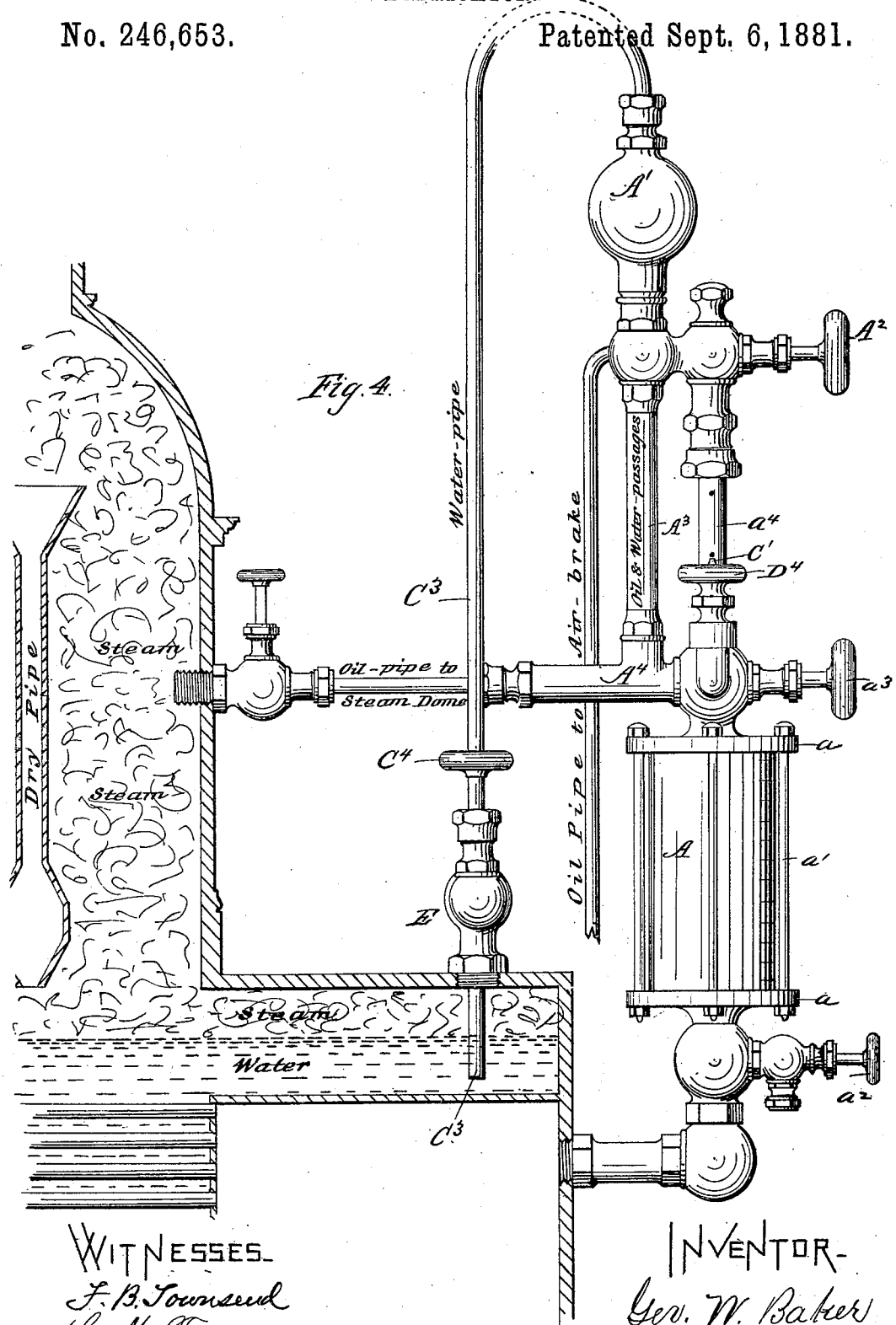

Fig. 4, Sheet 3, shows the lubricator attached to the head of a locomotive-boiler, and is a left-hand side elevation of a right-hand side apparatus, the construction and arrangement of the stand-pipe A³ for the passage of the oil and water being the same as that shown in Fig. 2 of the drawings. In this case the oil-pipe has an independent connection with the horizontal stem A⁴, and discharges the oil into the interior of the steam-dome for the purpose of lubricating the steam before it enters the dry-pipe on its way to the steam chests and cylinders. The chamber A' now becomes a water-reservoir, and is supplied with water instead of steam through a pipe, C³, one end of which is inserted in the chamber A', and the opposite end connected to and leading down inside of the boiler to a point sufficiently far enough below the water-line as to constantly keep the open end submerged, thereby securing a constant and regular flow of the water to the chamber A' and a uniform pressure to expel the oil from the lubricator. The water is caused to rise in the submerged pipe C³ and pass into the chamber A' by opening the water-valves at the top and bottom of the oil-reservoir, a partial vacuum being formed in the oil-reservoir and the water-passage leading therefrom to the chamber A'; and the water-pipe forming the communication between the boiler and the chamber A' is curved above the latter, so that a continuous circulation is maintained on the principle of a siphon. In some instances the location of the lubricator is such that the said chamber becomes so hot that a regular pressure cannot at all times be depended upon from condensation; but by this arrangement the full boiler-pressure on the lubricator is insured at all times. The flow of the water from the boiler to the chamber A' is controlled by means of the valve C⁴.

Figure 5:
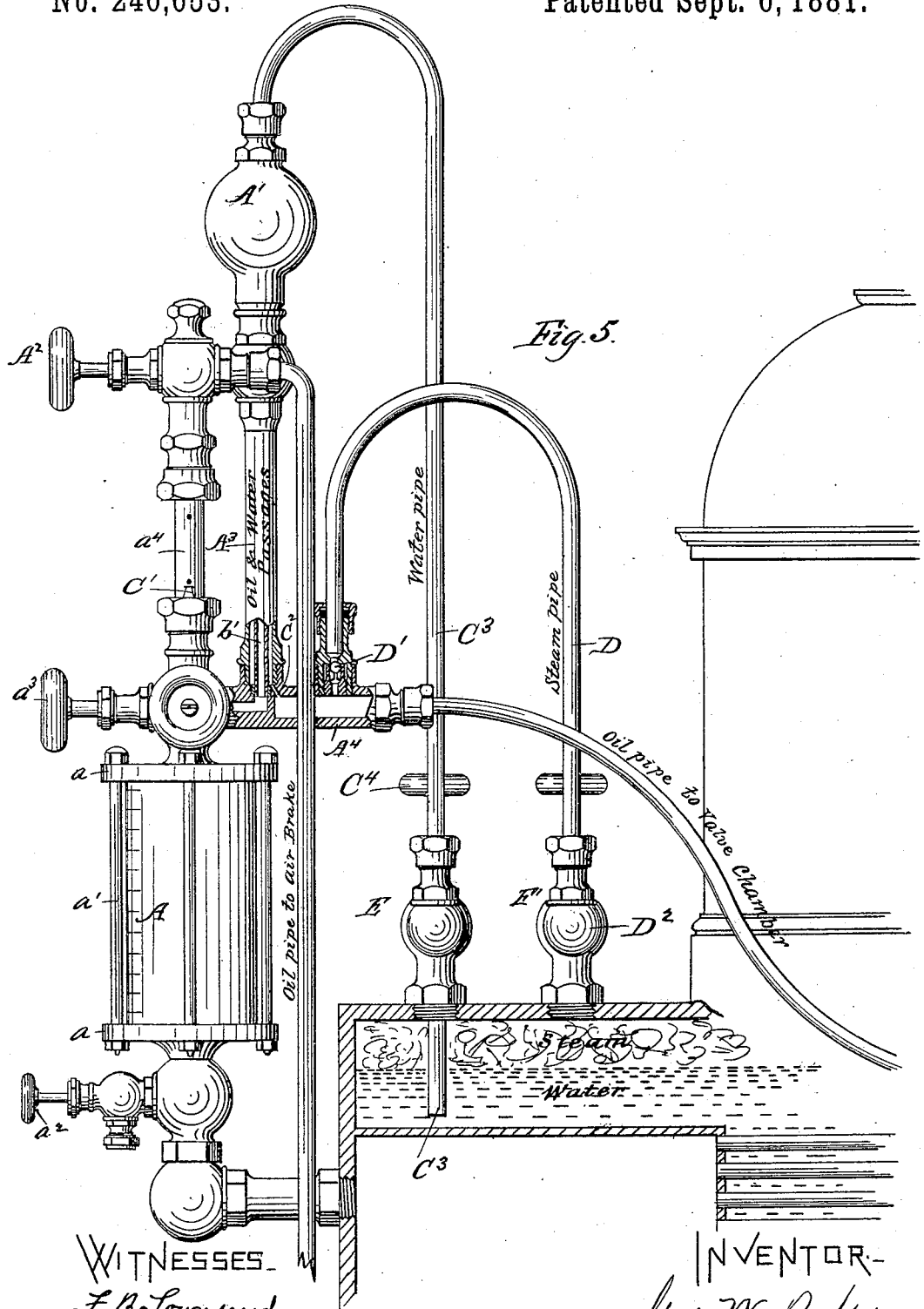
Figure 10:
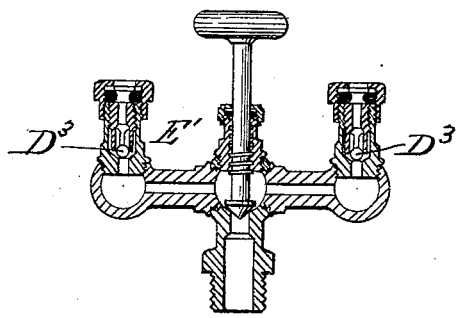

Fig. 5, Sheet 4, shows a right-hand-side elevation, portions of the apparatus being broken away, showing the interior arrangement. In this case the oil-conducting pipe leads direct to the valve-chamber of the engine. A steam-jet is here made use of, and consists of the steam-pipe D, one end of which is connected to the horizontal stem A⁴, and the opposite end having connection with the boiler at a point where the driest steam may be obtained. In the vertical passage connecting the steam-pipe D and the horizontal stem A⁴, I place a ball-valve, D', false-seating downward. In the bulb D², a section of which is shown in Fig. 10 of the drawings, I place another ball-valve, D³, which back or false seats in an upward direction. When these ball-valves are false-seated the passage is open, the parts being of the same construction as that shown and described in former patents issued to me. These ball-valves are arranged to work in unison, the object being to prevent the back-pressure from the steam-chest entering the passage or pipe D. The steam-pressure in the boiler exceeding that in the steam-chest or valve-chamber, these ball-valves are back-seated, which opens the passage and allows the steam to pass with the oil coming from the lubricator to the parts being lubricated. The essential function of this steam-jet is to prevent a vacuum forming in the steam chest and cylinder when the engine is running dry. The vacuum sometimes has the effect of drawing the water out of the glass indicating-tube. This steam-jet also prevents any excessive pressure in the chamber A' from too rapidly forcing the oil out of the lubricator when the engine is not working steam. As shown in Fig. 4 of drawings, I do not make use of the steam-jet, as the lubricant is discharged into the steam-dome, there being no vacuum to contend with.

Figure 6:
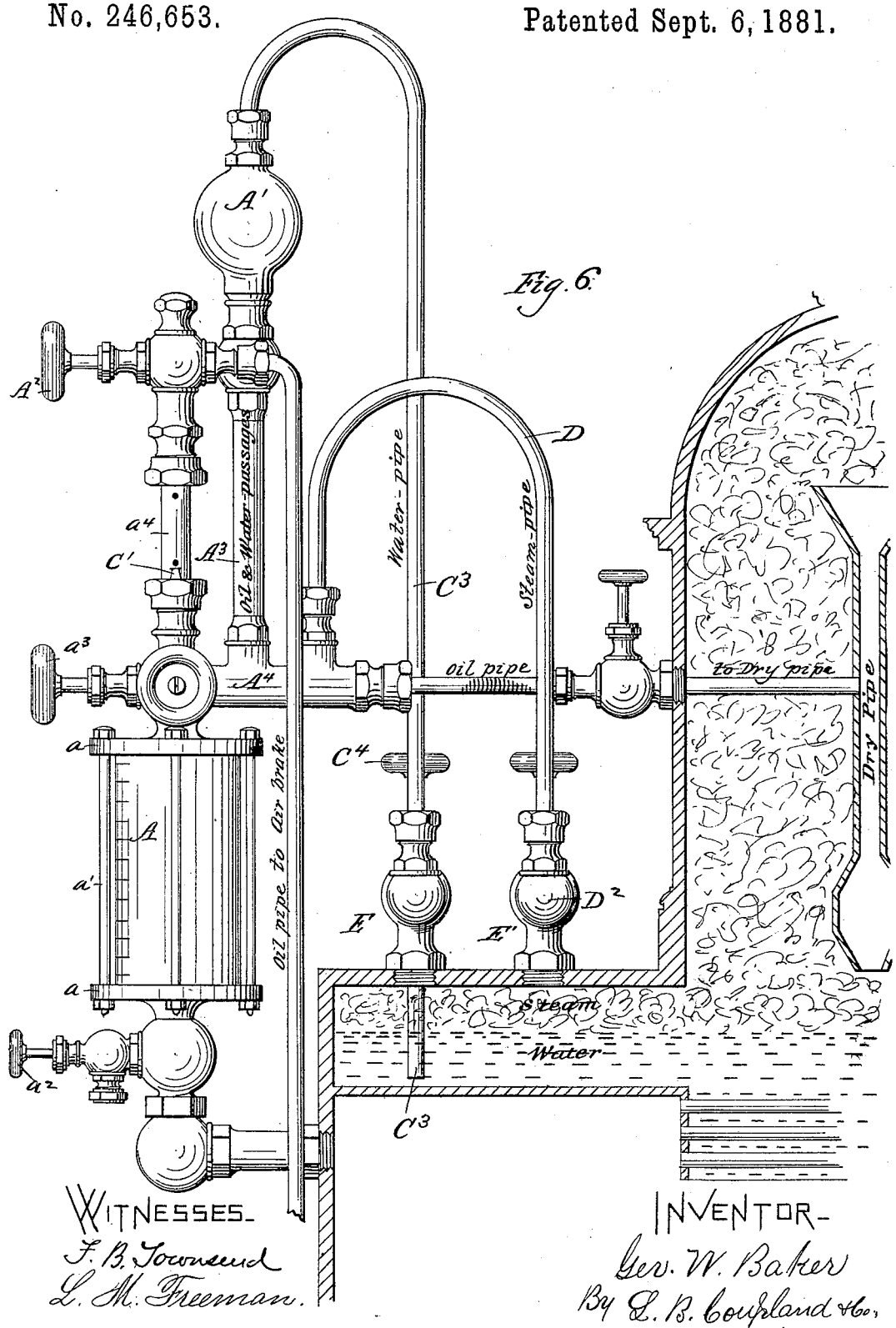

Fig. 6, Sheet 5, is also a right-hand elevation, the same as shown in Fig. 5, with the difference that the oil-conducting pipe leads into the dry-pipe on the inside of the steam-dome.

Figure 7:
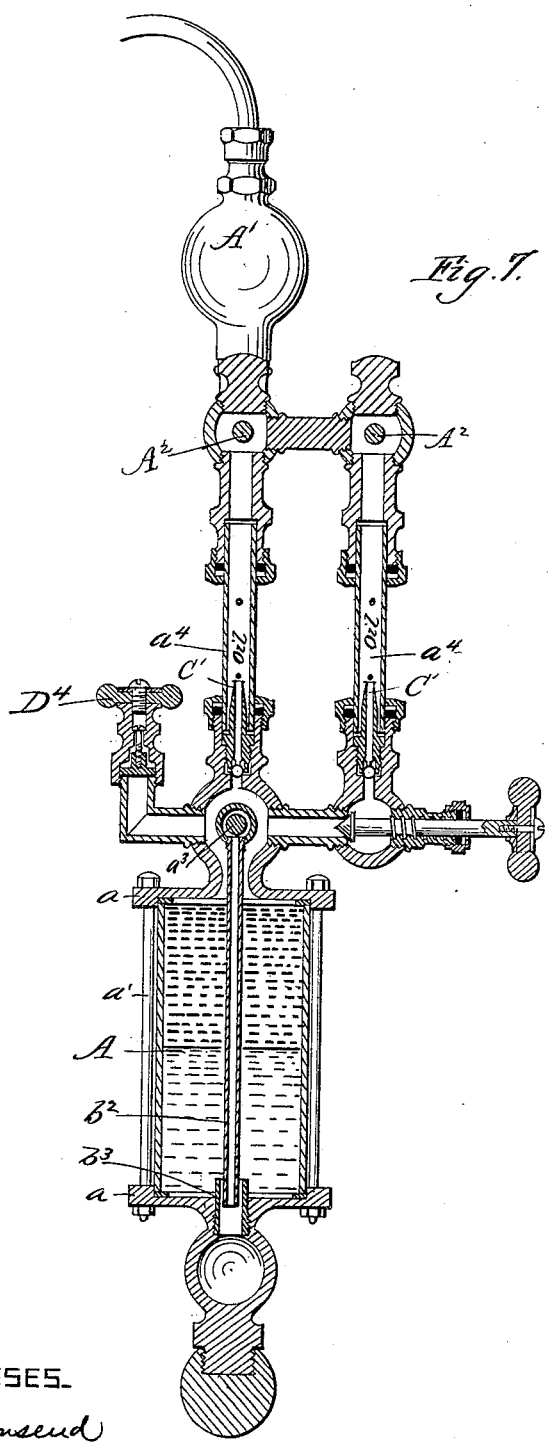

Fig. 7, Sheet 6, is a vertical transverse section of that portion of the apparatus proper below the condensing-chamber shown in Fig. 8 of the drawings. This shows a double visible feed, one being for the air-brake attachment. By removing the filler-cap D⁴ the reservoir may be charged with oil.

Figure 8:
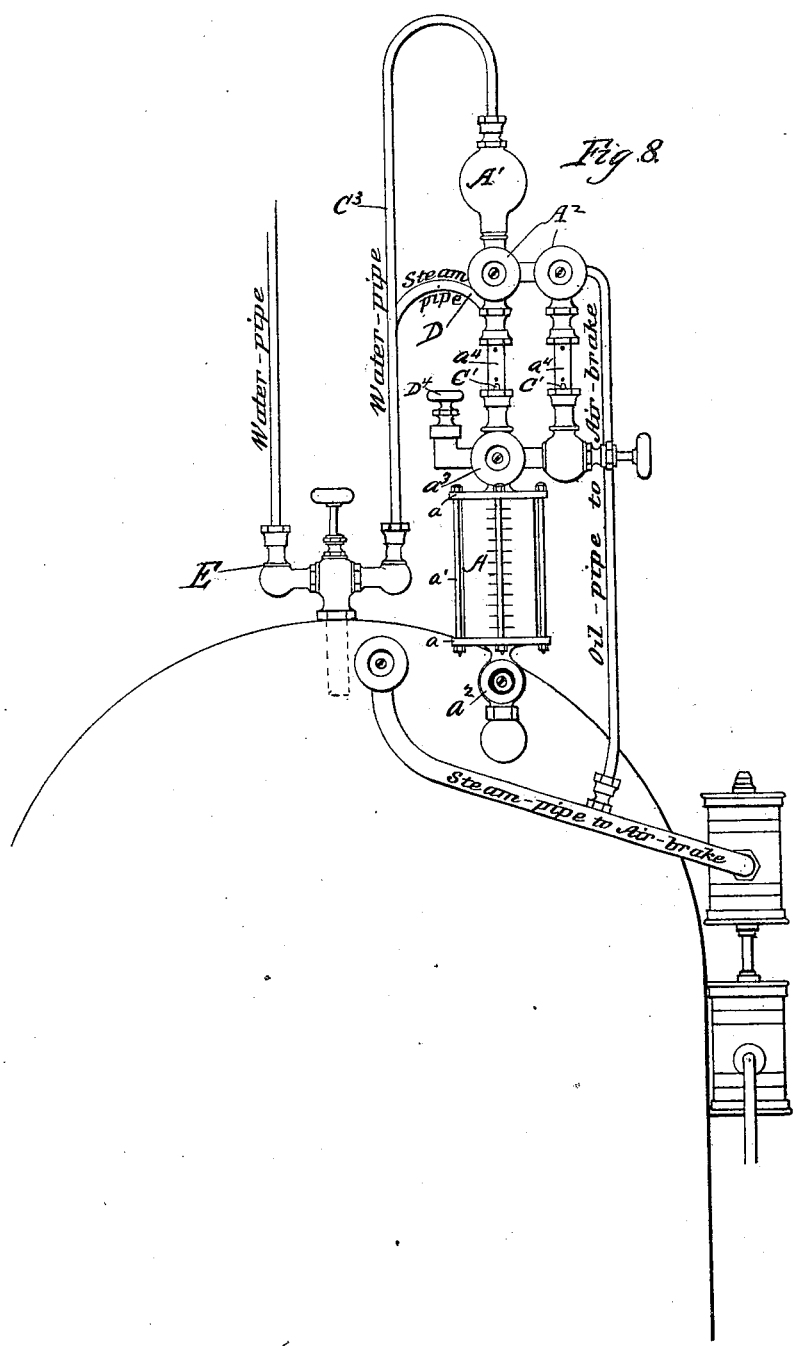

Fig. 8, Sheet 7, is a front elevation of the lubricating apparatus attached to the right side of the boiler, and showing a double visible feed, thereby adapting the device to also lubricate the air-brake attachment. The water-pipe (broken away) connects with the lubricating apparatus placed at the left side of the boiler to lubricate the engine on that side, the double water-valve E communicating with the water-reservoir of both lubricators.

Figure 9:
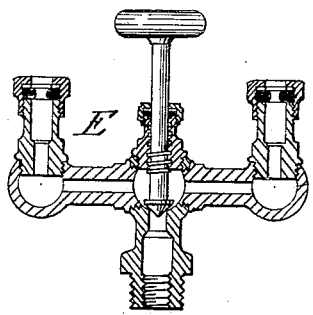

Fig. 9, Sheet 8, is a vertical transverse section of the double-way or branch valve E', (shown in Fig. 8.)

Fig. 10, Sheet 8, is a transverse section of the double steam-valve E', which is attached to the shell of the boiler, and supplies the jet of steam through the oil-conducting pipes, and prevents a vacuum from forming when the engines are running dry, the ball-valves $D^3$ being for the purpose hereinbefore set forth. This double steam-valve may be attached to the dome of the boiler for the purpose of procuring drier steam.

Fig. 11, Sheet 9, is a top view of the apparatus attached to the head of a locomotive-boiler, and is so arranged as to adapt one lubricator to lubricate both engines and the steam-cylinder of the air-brake. A T-coupling, $E^2$, is connected to the end of the horizontal stem $A^4$ and the oil-pipes made to branch therefrom to both engines. Lubrication is effected from one apparatus. In this case a straight way or single globe-valve is used for the water and steam connections with the boiler.

It would be impossible to successfully lubricate both engines of a locomotive from one and the same lubricator were not some provision made for preventing a vacuum forming when the engines are not working steam, for the reason that the expansion of the piston-packing would not be alike in both engines, and the cylinder having the more perfect vacuum would get all or most all of the oil. This I obviate by the use of the steam-jet before described, which prevents a vacuum and distributes the oil to both engines alike.

Having thus described my invention, what I claim, and desire to secure by Letters Patent, is—

1. In a lubricator of the character hereinbefore described, the combination, with the oil-reservoir A and the condensing-chamber A', of the stand-pipe $A^3$, the inclosed tube $b'$, and horizontal stem $A^4$, all constructed and arranged to operate as set forth.

2. The combination, with the stand-pipe $A^3$, inclosing the oil and water passages, of the horizontal stem $A^4$, the inclosed oil pipe or tube $B^4$, and the coupling B, substantially as set forth.

3. The combination, with the water-reservoir A', water-pipes $b'$ $b^2$, oil-chamber A, and indicator-tube $A^4$ of a lubricating apparatus, of a water-conducting pipe inserted in the shell of the boiler and extending to a point below the water-line, substantially as and for the purpose set forth.

4. The combination, with the oil passage or passages of a lubricating apparatus, of the independent or auxiliary steam-pipe, D, whereby a jet of steam is injected into and passes with the oil to the surfaces being lubricated, substantially as and for the purpose set forth.

5. The combination, with a lubricating apparatus, of the bell-mouthed nozzle C', substantially as and for the purpose set forth.

GEORGE W. BAKER.

Witnesses:
W. A. SCHONFELD,
L. B. COUPLAND.